Aug. 21, 1928.

B. KUMAGAI 1,681,414

DETACHABLE HANDLE

Filed May 12, 1926

INVENTOR.
Buntaro Kumagai
BY Nestall and Wallace
ATTORNEYS.

Patented Aug. 21, 1928.

1,681,414

UNITED STATES PATENT OFFICE.

BUNTARO KUMAGAI, OF LOS ANGELES, CALIFORNIA.

DETACHABLE HANDLE.

Application filed May 12, 1926. Serial No. 108,535.

This invention relates to a handle adapted to be detachably mounted on a stem and to frictionally engage the same. More specifically, the present invention appertains to a handle formed of resilient wire and arranged in helical form.

It is an object of this invention to provide a handle comprising sets of helical convolutions arranged side by side with the convolutions overlapping and interlaced so as to receive a stem within the convolutions, the handle being so constructed as to resiliently tend to separate the sets and thereby grip the stem.

Figure 1:
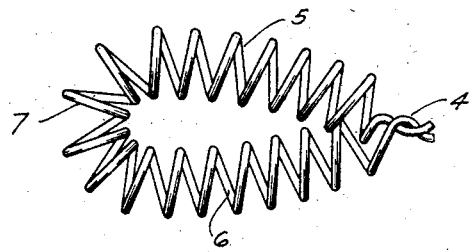
Figure 2:
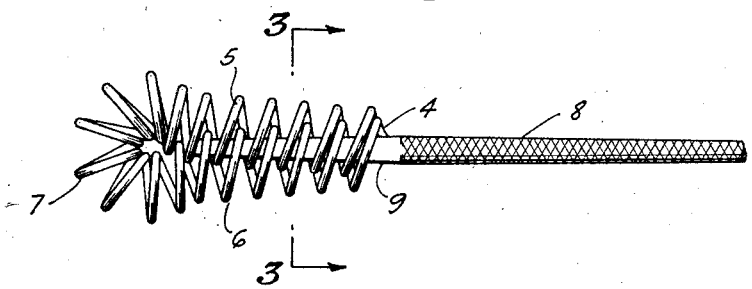

These objects together with other objects and corresponding accomplishments are obtained by means of the embodiment of my invention illustrated in the accompanying drawing, in which:

Fig. 1 is an elevation of a demounted handle; Fig. 2 is an elevation of a handle mounted upon the stem of a tool; and Fig. 3 is a section as seen on the line 3—3 of Fig. 2.

Referring more particularly to the drawing, the handle comprises preferably a resilient wire arranged in the form of a helix. The helix is bent about its major axis to bring the ends of the wire together so that they may be secured to one another as indicated by 4. The construction thus secured consists of two sets of helical convolutions, one being indicated by 5 and the other by 6. The sets are disposed side by side and joined at one end by a head portion 7. This provides a construction such that there is a resilient tendency to separate the sets of convolutions and hold them in the position shown in Fig. 1. The article thus formed is ready for mounting upon the stem of a tool or other instrument.

Figure 3:
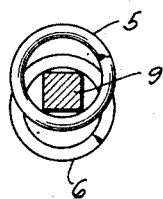

Referring more particularly to Figs. 2 and 3, 8 indicates a file having a stem or shank end 9. In this particular instance, the shank end 9 is square in cross-section, although this is not essential to the structure, any tool or device having a stem may be employed.

In order to mount the handle upon the stem, the handle as shown in Fig. 1, is grasped and the convolutions of sets 5 and 6 are pressed toward one another so that they interlace and overlap as shown in Fig. 2. The stem is then pushed in through the center of the overlapping convolutions so that they are locked together, the tendency being for the sets to separate. This causes a pull outwardly upon the inner sides of the convolutions and pressure against the stem frictionally engaging the latter. To remove the handle, the latter is grasped and the sets of convolutions pressed toward one another to relieve their pressure upon the stem, whereup the latter may be pulled outwardly.

Whereas, I have shown the device, as forming the handle of a tool, it has other uses. For illustration, a nail driven into the wall may serve as a hanger for garments and other objects. The device may be placed over the nail to serve as a cap and to provide a smooth cover for the head.

What I claim is:

1. A handle comprising a resilient wire of helical convolutions looped along its major axis so as to provide sets of convolutions arranged side by side, the ends of said wire being secured together to hold the end convolutions interlaced, whereby said sets may be moved toward each other with other of the convolutions overlapping and interlaced.

2. In a handle, the combination with a shank of a resilient wire of helical convolutions looped along its major axis so as to provide sets of convolutions arranged side by side, the ends of said wire being secured together to hold the end convolutions interlaced, said shank being disposed within interlaced convolutions so as to be embraced and gripped thereby.

In witness that I claim the foregoing I have hereunto subscribed my name this 7th day of April, 1926.

BUNTARO KUMAGAI.